United States Patent Office 3,217,311
Patented Nov. 9, 1965

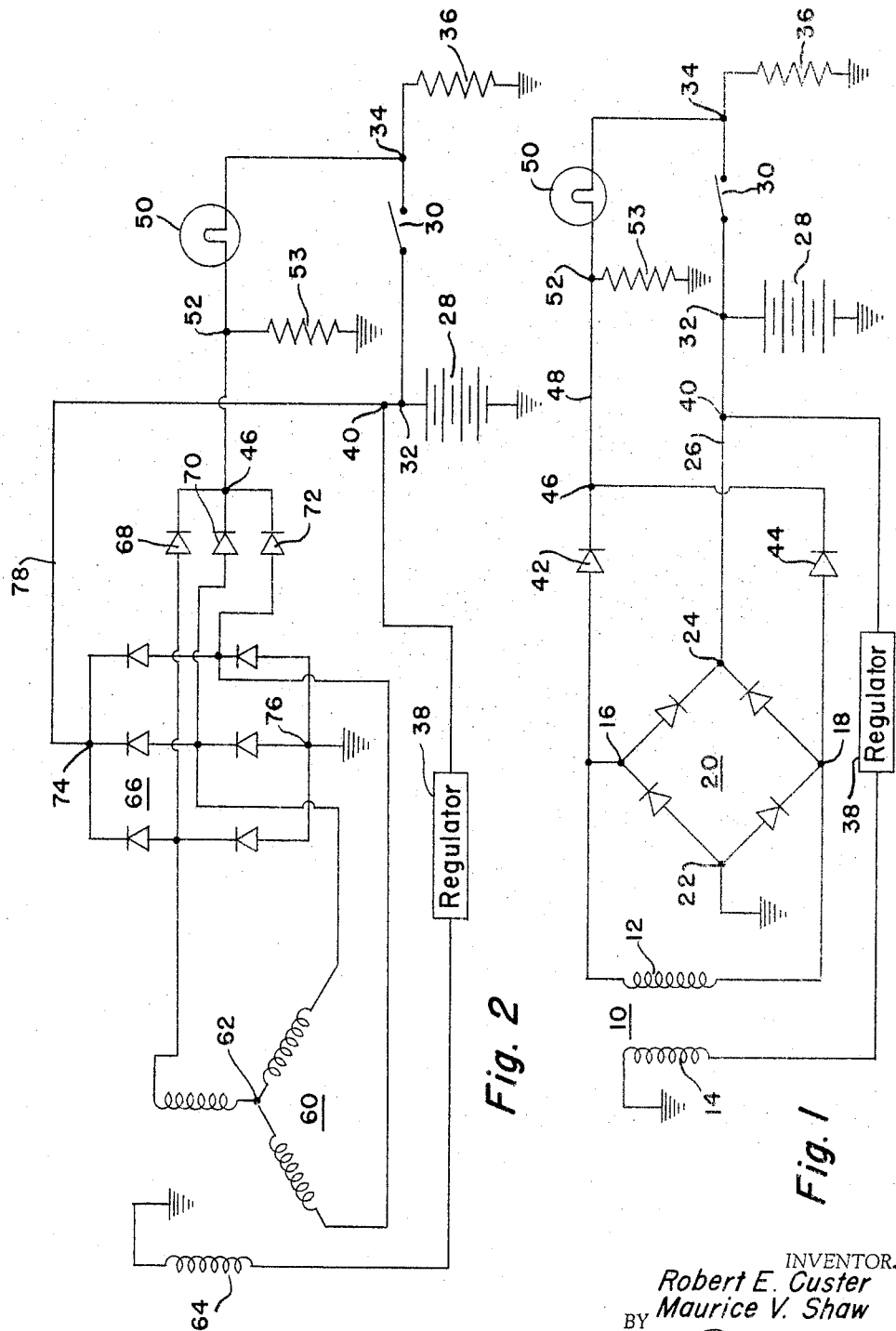

3,217,311
SIGNAL LAMP FOR A BATTERY CHARGING
CIRCUIT
Robert E. Custer and Maurice V. Shaw, Anderson, Ind., assignors to General Motors Corporation, Detroit, Mich., a corporation of Delaware
Filed July 9, 1962, Ser. No. 208,338
5 Claims. (Cl. 340—249)

This invention relates to a signal lamp system and more particularly to a signal lamp system for use with alternating current generators.

One of the objects of this invention is to provide a signal lamp arrangement for a motor vehicle electrical system that is operative to indicate when the output voltage of an alternator is sufficient to charge the battery of the system.

Another object of this invention is to provide a signal lamp system for an alternating current generating arrangement wherein the signal lamp is energized from the battery when a switch is closed and wherein static means such as diodes are used to impress substantially equal potentials on either side of the signal lamp when the A.C. generator has a predetermined output voltage.

A more specific object of this invention is to provide a signal lamp system for use with an alternating current generator that has its output rectified by a bridge rectifier, the system including auxiliary diodes connected with the output winding of the generator for applying a potential to one side of the signal lamp that is substantially equal to the potential applied to the other side of the signal lamp from one terminal of the bridge rectifier through a switch.

Further objects and advantages of the present invention will be apparent from the following description, reference being had to the accompanying drawings wherein a preferred embodiment of the present invention is clearly shown.

In the drawings:

FIGURE 1 is a schematic circuit diagram of a signal lamp system used with a single phase A.C. system.

FIGURE 2 is a schematic circuit diagram of a signal lamp system as used with a three-phase A.C. system.

Referring now to the drawings and more particularly to FIGURE 1, the reference numeral 10 generally designates an alternating current generator which has an output winding 12 and a field winding 14. This alternating current generator may be of any well-known type and is driven in a motor vehicle system by the engine that propels the motor vehicle.

The output winding 12 is connected with the A.C. input terminals 16 and 18 of a single-phase full wave bridge rectifier network 20. This bridge rectifier network 20 is comprised of four diodes which preferably are of the semiconductor type and may be, for example, silicon diodes. One of the D.C. output terminals 22 of the bridge rectifier is grounded whereas the other D.C. output terminal 24 is connected with lead wire 26. The lead wire 26 feeds a battery 28 and other D.C. loads on the motor vehicle.

A manually operable ignition switch 30 is connected between junction 32 and junction 34. The junction 34 can feed an ignition coil which is shown as a resistive load 36. A voltage regulator 38 of any conventional construction is connected between junction 40 and the field winding 14. This regulator controls the field current in order to maintain a substantially constant output voltage from the generator and bridge rectifier 20.

The signal light system of this invention employs a pair of auxiliary diodes 42 and 44 which preferably are of the semiconductor type and may be of the silicon type. One side of diodes 42 and 44 are connected together at junction 46 whereas the opposite sides of these diodes are connected across the A.C. output winding 12. The junction 46 is connected with lead wire 48 which in turn is connected to one side of a signal lamp 50. A resistor 53 is connected between junction 52 and ground. One side of the signal lamp is connected with junction 34 as is clearly apparent from FIGURE 1.

In a twelve volt system the signal lamp 50 may be a six-volt lamp and the resistor 53 may be, for example, 25 ohms. It is pointed out that the resistor 53 could be circuit elements other than a resistor so long as it completes a circuit to ground for junction 52.

When the ignition switch 30 is closed the ignition loads 36 will be energized from the battery 28 and the signal lamp 50 will be energized. The circuit for energizing the signal lamp 50 is from junction 32, through switch 30, junction 34, through signal lamp 50 and then through resistor 53 to ground. The signal lamp will now be lighted indicating that the generator is not producing an output voltage.

When the generator is driven by the engine and is producing an output voltage, it is seen that a D.C. voltage will appear at junction 40 due to its connection with one of the D.C. output terminals 24 of the bridge rectifier 20. This voltage may be, for example, fourteen volts in a twelve volt system. With the A.C. output winding 12 having an output voltage the junction 46 will have a D.C. voltage or potential due to the provision of diodes 42 and 44. It can be seen that one side of the signal lamp 50 will have substantially the same potential as junction 46 whereas the opposite side of the signal lamp will have substantially the same potential as junction 40. These potentials will be substantially equal so that the signal lamp will become extinguished. This will indicate that the alternator 10 is developing an output voltage and will indicate that the bridge rectifier 20 is developing a proportionate D.C. output voltage.

The system of FIGURE 2 is identical with the system of FIGURE 1 with the exception that a three-phase alternator is used rather than a single-phase alternator. In view of this, the same reference numerals have been used in FIGURE 2 to identify parts which are the same as those used in FIGURE 1.

In FIGURE 2 the three-phase alternator is designated in its entirety by reference numeral 60. This alternator has a three-phase Y-connected output winding 62 and a field winding 64. The three-phase output winding is connected with a three-phase full wave bridge rectifier network 66 which is comprised of six silicon diodes. The A.C. input terminals of the bridge rectifier 66 are connected to one side of diodes 68, 70 and 72 which perform the same function in FIGURE 2 as the diodes 42 and 44 in FIGURE 1. The D.C. output terminals of bridge rectifier 66 are designated by reference numerals 74 and 76, the output terminal 76 being grounded and the output terminal 74 being connected with lead wire 78. The lead wire 78 is equivalent to the lead wire 26 shown in FIGURE 1.

The system of FIGURE 2 operates in the same manner as the system of FIGURE 1 with the diodes 68, 70 and 72 impressing a potential on one side of the signal lamp which is substantially equal to the potential of output terminal 74 which is impressed on the opposite side of the signal lamp when the generator 60 has its predetermined output and switch 30 is closed.

While the embodiment of the present invention as herein disclosed constitutes a preferred form, it is to be understood that other forms might be adopted.

What is claimed is as follows:

1. In combination, an alternating current generator having an output winding, a full-wave bridge rectifier network comprised of a plurality of first diodes having first and second D.C. output terminals and A.C. input terminals, a battery, means connecting opposite sides of said battery with said D.C. output terminals of said bridge rectifier network whereby said bridge rectifier network provides charging current to said battery, at least one second diode having one side thereof connected with one of said A.C. input terminals of said bridge rectifier network, the opposite side of said second diode being connected to a first junction, a signal lamp, a manually operable switch, means connecting said first junction to one side of said signal lamp, a second junction connected with one side of said battery and with said first D.C. output terminal of said bridge rectifier network, means connecting said second junction to an opposite side of said signal lamp including said manually operable switch, and a circuit connected between said first junction and the side of said battery which is connected to said second D.C. output terminal whereby said signal lamp is energized through said circuit when said manually operable switch is closed and when the output voltage of the generator is below a predetermined value, the potential of said first and second junctions being of such values as to extinguish said signal lamp when said generator has a predetermined output voltage.

2. In combination, an alternating current generator having an output winding, a full-wave bridge rectifier network comprised of a plurality of first diodes having first and second D.C. output terminals and A.C. input terminals, means connecting said output winding with said A.C. input terminals, a battery, means connecting opposite sides of said battery with said D.C. output terminals of said bridge rectifier network whereby said bridge rectifier network provides charging current to said battery, a plurality of second diodes having sides of the same polarity connected with said A.C. input terminals of said bridge rectifier network, the opposite side of said second diodes being connected to a first junction, a signal lamp, a manually operable switch, means connecting said first junction to one side of said signal lamp, a second junction connecting one side of said battery with said first D.C. output terminal of said bridge rectifier network, means connecting said second junction to an opposite side of said lamp including said manually operable switch, and a circuit connected between said first junction and the side of said battery which is connected to said second D.C. output terminal whereby said signal lamp is energized through said circuit when said manually operable switch is closed and when the output voltage of the generator is below a predetermined value, the potential of said first and second junctions being substantially equal when said generator has a predetermined output voltage whereby said signal lamp is extinguished.

3. In combination, an alternating current generator having an output winding, a bridge rectifier network comprised of a plurality of first diodes having A.C. input terminals and first and second D.C. output terminals, means connecting said output winding with said A.C. input terminals, a battery, means connecting said battery across said D.C. output terminals of said bridge rectifier network whereby said bridge rectifier network supplies charging current to said battery, a plurality of second diodes having sides of common polarity connected to said A.C. input terminals of said bridge rectifier network, the opposite side of said second diodes being connected together at a first junction, a second junction defined by the connection of one side of said battery with said first D.C. output terminal of said bridge rectifier network, a manually operable switch, a signal lamp, a series circuit connecting said first and second junctions including said signal lamp and said manually operable switch, and a circuit connected between a side of said signal lamp that is connected with said first junction and the side of said battery that is connected with said second D.C. output terminal, said signal lamp being energized by said battery through said manually operable switch and through said circuit when the output voltage of said output winding is below a predetermined value, said series circuit connecting said first and second junctions applying substantially equal potential to opposite sides of said signal lamp when said output winding has an output voltage that is above a predetermined value and when said manually operable switch is closed.

4. The combination according to claim 3 where said circuit that is connected between said first junction and the side of the battery connected with said second D.C. output terminal includes a resistor.

5. The combination according to claim 3 where the A.C. generator has a three phase output winding and where the bridge rectifier is a three phase full-wave bridge rectifier network.

References Cited by the Examiner

UNITED STATES PATENTS 2,062,274  11/36  Rees _____ 307—88.5
2,817,830  12/57  Raver _____ 340—249

NEIL C. READ, *Primary Examiner.*